L. DUNKELSBERG.
SPECTACLES.
APPLICATION FILED SEPT. 24, 1919.
1,374,287.
Patented Apr. 12, 1921.
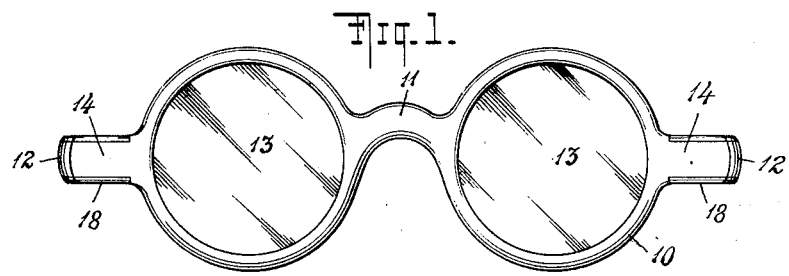
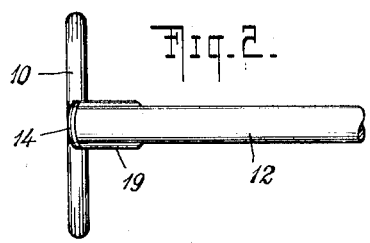
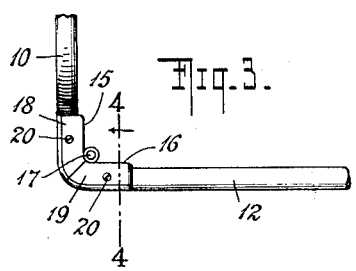
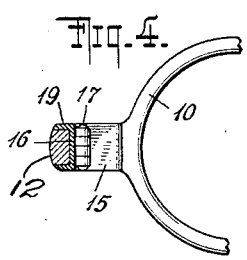
WITNESSES
INVENTOR
LOUIS DUNKELSBERG
BY
ATTORNEYS

UNITED STATES PATENT OFFICE.

LOUIS DUNKELSBERG, OF BROOKLYN, NEW YORK.

SPECTACLES.

1,374,287. Specification of Letters Patent. Patented Apr. 12, 1921.

Application filed September 24, 1919. Serial No. 325,851.

*To all whom it may concern:*

Be it known that I, LOUIS DUNKELSBERG, a citizen of the United States, and resident of the borough of Brooklyn, county of Kings, city and State of New York, have invented certain new and useful Improvements in Spectacles, of which the following is a specification.

My invention relates to spectacles and more particularly to that type thereof in which the lens frames and temples are constructed of tortoise shell, imitation tortoise shell, celluloid and the like and has for its object to provide a novel and efficient hinge construction whereby the temples are connected with the lens frames. Other more specific objects of my invention will appear from the description hereinafter and the features of novelty will be pointed out in the appended claims.

For the purposes of illustration and description, an example of my invention is shown in the accompanying drawings in which Figure 1 is a front view of a pair of spectacles; Fig. 2 is a side view thereof; Fig. 3 is a detail plan view; and Fig. 4 is a detail sectional view on the line 4—4 of Fig. 3.

As shown in the drawings, the spectacles comprise the lens frames 10, the nose bridge 11 connecting the same, and the temples 12, all of which may be constructed in any well known manner of genuine or imitation tortoise shell, celluloid or the like, it being understood that the customary lenses 13 are mounted in the frames 10, also in any recognized way. The novel hinges whereby the temples 12 are pivotally connected with the lens frames 10 or more specifically with lugs 14 forming integral parts thereof comprise two sections 15 and 16 hinged together at 17 and provided with flanges 18 and 19 respectively. The latter extend transversely to the sections 15 and 16 so as to form channeled members, as shown in Fig. 4 and preferably constitute integral parts of said sections 15 and 16.

In combining the hinges with the spectacle, the channeled members are fitted over the lugs 14 and over the ends of the temples 12 with the sections 15 and 16 in surface engagement with the inner surfaces of said lugs and temples respectively, and the flanges 18 and 19 projecting transversely over the same as shown. It will be understood that the dimensions of the parts preferably are such, that the lugs 14 and temples 12 fit snugly into the respective channeled members of each hinge. Any suitable means may be utilized for securing the hinge members upon the lugs 14 and temples 12; for instance, as shown, screws 20 may pass vertically through the flanges 18 and lugs 14 and through the flanges 19 and temples 12 for this purpose. It will be understood that equivalent devices may be substituted for the screws 20 and that said devices may, if desired, comprise integral parts of the flanges 18 and 19. In all cases the fastening devices extend in directions parallel with the sections 15 and 16 and are always invisible from the front or sides of the spectacles. With this arrangement the exposed, visible faces of the temples 12 and lugs 14 are unmarred by screws, rivets or other fastening devices as is now generally the case. In addition, the temples are firmly and securely connected with the lens frames without interfering with the necessary pivotal movements of the temples, the flanges 18 and 19 providing means whereby the rigidity and strength of the construction is increased. Furthermore, the arrangement is such that the attractiveness of the spectacles is increased to a maximum extent whereby the commercial value and saleability thereof is enhanced. The novel hinge construction is extremely simple and economical to produce and is readily and quickly attached in position without the necessity for any specially skilled labor.

The opposed ends of the flanges 18 and 19 and of the lugs 14 and temples 12 may be mitered, as illustrated, to arrest the outward pivotal movements of the temples relatively to the lens frames or any other equivalent and suitable arrangement may be used for this purpose.

Various changes in the specific form shown and described may be made within the scope of the claims without departing from the spirit of my invention.

I claim:

1. The combination of lens frames of the kind described, lugs projecting outwardly therefrom, a pair of temples and hinges constituting units distinct from said lugs and temples comprising channeled members one of which is fitted over one of said lugs and the other of which is fitted over one of said temples whereby the latter are pivotally connected with said lens frames.

2. The combination of lens frames of the kind described, lugs projecting outwardly therefrom, a pair of temples, hinges constituting units distinct from said lugs and temples comprising channeled members one of which is fitted over one of said lugs and the other of which is fitted over one of said temples whereby the latter are pivotally connected with said lens frames and fastening devices extending inwardly transversely to the flanges of said channeled members for securing the latter to said lugs and temples.

3. The combination of lens frames of the kind described, lugs projecting outwardly therefrom, a pair of temples, hinges comprising pivotally connected hinge sections in surface engagement with the inner surfaces of said lugs and temples respectively, flanges projecting outwardly from said sections and over said lugs and temples and fastening means extending in directions parallel to said hinge section whereby said flanges are secured to said lugs and temples.

4. The combination of lens frames of the kind described, lugs projecting outwardly therefrom, a pair of temples, hinges comprising pivotally connected hinge sections in surface engagement with the inner surfaces of said lugs and temples respectively, flanges projecting outwardly from said sections and over said lugs and temples and fastening devices extending transversely through said flanges and said lugs and temples in directions parallel to said hinge sections whereby said hinges are secured to said lugs and temples.

In testimony whereof I have hereunto set my hand.

LOUIS DUNKELSBERG.